Patented Feb. 13, 1934

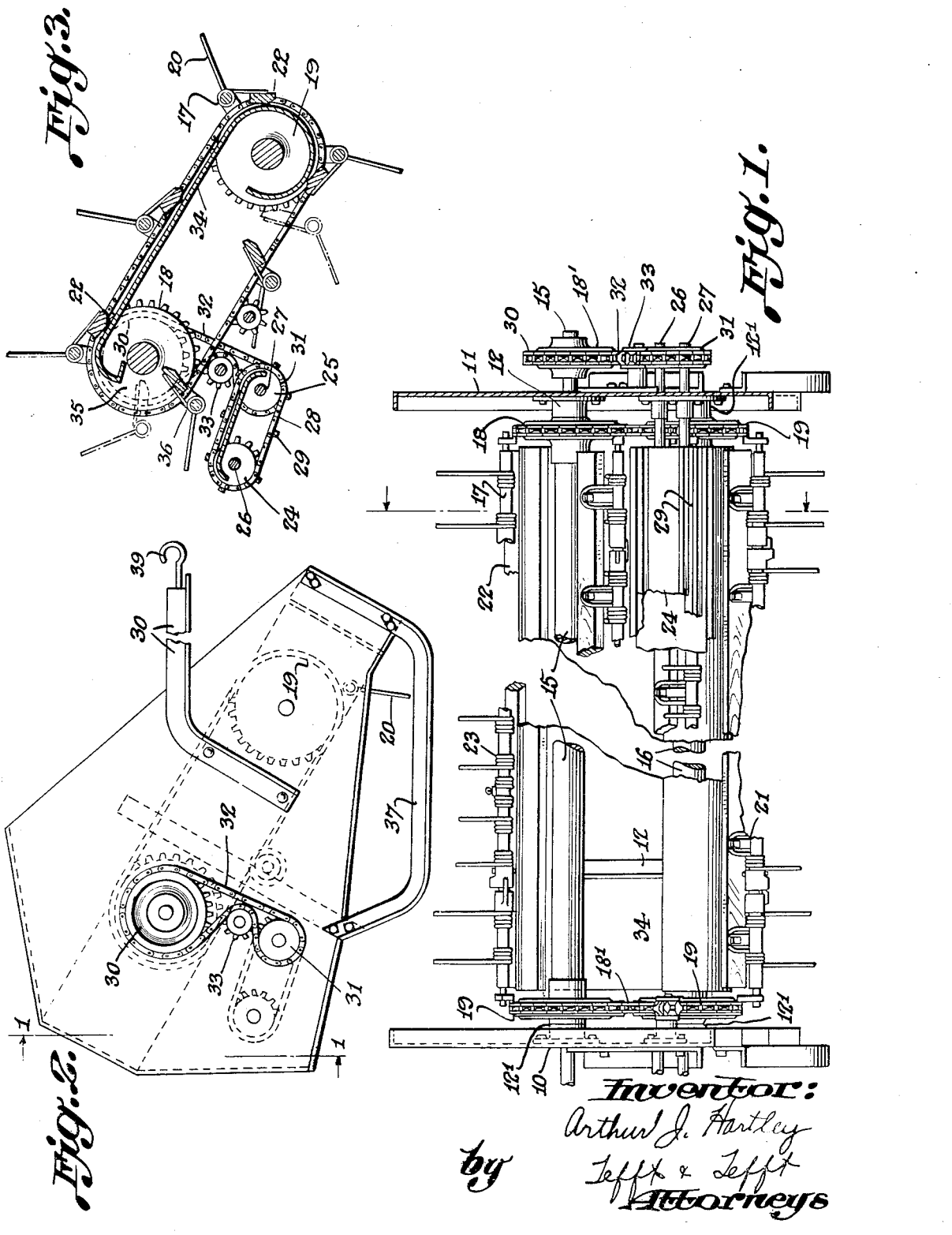

1,946,692

UNITED STATES PATENT OFFICE 1,946,692

GRAIN PICK-UP MECHANISM

Arthur J. Hartley, Peoria, Ill.

Application October 4, 1929. Serial No. 397,223

3 Claims. (Cl. 56—364)

This invention relates to grain pick-up mechanism.

One of the objects of the invention is in the provision of a grain pick-up mechanism fashioned in such manner that the grain load that is picked up by the intermittent series of grain fingers is carried to a point adjacent a grain receiving member and suddenly released by the action of the fingers or rather mechanism in connection therewith.

Another object lies in the provision of grain pick-up mechanism wherein an endless carrier is provided with spaced series of grain pick-up fingers, there being provided mechanism which operates in connection with the grain pick-up fingers to suddenly release the grain load carried by the fingers at a point adjacent the grain-receiving mechanism.

Other objects will appear in the following specification, taken in connection with the annexed drawing, in which—

Fig. 1 is a front elevational view cut away in various portions for a more detailed showing of the mechanism of my grain pick-up device;

Fig. 2 is a side elevation thereof; and

Fig. 3 is a cross-sectional diagrammatic view showing the mechanism for accomplishing the release of the series of grain pick-up fingers.

The present structure is adapted to be used in connection with grain handling machinery of the type referred to as a combine harvester.

This device is adapted to be operatively connected to and driven by a combine harvester and is, as a matter of fact, an accessory to such mechanism. Generally, with respect to the device, it may be stated that same is adapted, by the operation of a series of fingers, to raise the grain from the ground where it has fallen, after being cut, thereafter elevating same and carrying it rearwardly to a point adjacent either a grain receiving portion or to a position where it is adapted to be operated upon by a following machine, such as a harvester or the like.

Referring specifically to the drawing, the two end portions designated 10 and 11 are connected by an interior supporting framework 12. Plural sprockets 18 and 19, mounted upon shafts 15 and 16, are connected and driven unitarily by endless connecting chains 18'. Shafts 15 and 16 are supported by bearings 12' which are suitably secured to framework 12.

Chains 18' carry, at spaced intervals, fixtures adapted to support longitudinal rods 17 upon which are rotatably mounted a plurality of pick-up fingers 20, and extending portion of each pair of fingers being secured to longitudinally disposed cross slats 22. The arrangement is best shown in Fig. 3.

It will be noted that the fingers 20 are set at such an angle as to most efficiently grasp the fallen grain and thereafter elevate same at substantially the angle shown in the detail Figure 3 of the drawing. These fingers may or may not have a spring tensioned connection 23 with the cross slats 22.

Disposed below the mechanism just described and slightly rearwardly thereof is a grain receiving platform which consists of the following parts: Two drums 24 and 25 are carried by shafts 26 and 27 respectively. A second endless carrier or apron 28 having the cross slats 29 thereon is mounted to move about these drums, rotation thereof being in a direction to deliver the grain picked up by the fingers and dropped thereupon directly into the following machine such as a harvester. This carrier apron it will be noted from the driving mechanism therefor, operates at a considerably greater speed than the first mentioned apron.

Driving mechanism for the chain 18' is provided in the gear 30 secured to the projecting end of the shaft 15. Movement of the grain receiving apron 28 is also accomplished through the gear 31 which in turn is driven by a chain connection 32 from the before mentioned driven gear 30. An idler gear 33 is mounted between the gears 30 and 31.

The cross slats 22 and plural grain pick-up fingers has disposed thereunder in the position shown perhaps best in Figure 3, a stationary metal shelf 34, which is so fashioned as to permit the slats 22 to slide thereover. Thus is formed an endless carrier adapted to pick-up and transport grain from the field to additional distributing means, as described. Shelf 34 is not only curved near its rear end, but it will be noted is cut away sharply at the end of the curve, this construction being best shown in Fig. 3 of the drawing, and being designated 35.

The shelf 34 is so formed at 35 that, as the pick-up mechanisms advance toward this end following the circular line of sprocket 18, the comparatively heavy slats 22 tend to follow the line of the end 35 and fall backward toward the center of sprocket 18. This movement rotates pick-up members 20 upwardly as indicated in dotted lines in Fig. 3.

Continued movement of the mechanism carries the pick-up mechanism downwardly, with the pick-up members 20 disposed approximately as shown at 36 in Fig. 3, to move them into contact with the slats 29 of the comparatively rapidly moving apron 28 in a relation approximately parallel with the movement thereof.

It will be noted that the continued movement of the pick-up fingers with respect to the apron 28 is such that there is a wiping action between the conveyor and the fingers, thus preventing any possibility of the grain being carried around by the fingers and apron carrying same.

Referring to the operation of the grain pick-up mechanism, it will be seen that this mechanism generally conforms to other mechanisms of the same general character, in that an endless carrier mechanism is adapted to have a series of grain pick-up fingers which operate to pick up the fallen grain and to carry same rearwardly upon a slight elevation to a point adjacent some sort of grain receiving member. In the present instance, I find the grain delivered upon an endless apron which in turn tends to carry the grain to a harvester.

Applicant's structure differs from other grain pick-up mechanism in that the movement of the series of grain pick-up fingers is changed at the point of delivery of the grain upon either the grain receiving mechanism or upon the receiving end of a following grain handling machine. This is perhaps most clearly shown in Fig. 3 of the drawing, wherein it is apparent that the fingers do not travel in a conventional manner about the rear sprockets but on the contrary the grain fingers attached to the slats, in the movement about the rear portion 35 have their angles suddenly changed first due to the sharp curving of the shelf 35, the slats 22 being permitted to drop suddenly vertically downwardly because of the cutting away of the shelf itself. By the described movement of the grain handling fingers, the grain carried thereby is delivered quickly and directly upon the grain receiving mechanism without possible conflict with the preceding series of fingers. Such control of the grain pick-up fingers prevents any possibility of the grain being carried around the apron or any possibility of clogging at the point of delivery, due to a uniform and slow release of the grain which is common in other grain pick-up mechanism.

It will also be noted that in the movement of the fingers with respect to the apron 28, there is a stripping action between the fingers and the second mentioned carrier which further prevents any possibility of grain clogging or being carried around by the apron.

Further, with respect to the stripping action, it might be stated that the speed of the apron 28 is considerably in excess of the speed of the apron carrying the grain pick-up fingers, which the result that the variance in speed greatly assists in stripping the grain from said fingers.

The foregoing has described the structure and function of my grain pick-up mechanism.

The unit as described is adapted to be moved across the grain field upon skid members 37, by means of its attachment to a mower or other harvesting machine, the attachment being accomplished through extending frame portions such as 38 and hooks 39.

What I claim is:

1. In a grain pick-up machine, in combination, an endless carrier having a series of pick-up fingers spaced at intervals thereon normally operating to pick up the grain, and a grain distributing apron disposed in a manner to receive the grain elevated by the pick-up fingers, said grain distributing apron co-operating with the fingers to accomplish the stripping of the grain from the fingers during the movement of same thereover.

2. In a grain pick-up machine, in combination, an endless carrier having a series of pick-up fingers spaced at intervals thereon normally operating to pick up the grain and a grain distributing apron disposed in a manner to receive the grain discharged from the said carrier, said distributing apron operating at a greater speed than the first named carrier and thus accomplishing a stripping action with respect to the pick-up fingers.

3. In a grain pick-up machine, in combination, an endless carrier having a series of pick-up fingers spaced at intervals thereon normally operating to pick up the grain, mechanism cooperating with the pick-up fingers causing them to release their load quickly, and a grain distributing apron operating at a greater speed than the endless carrier and cooperating with the pick-up fingers to accomplish a stripping action with respect thereto.

ARTHUR J. HARTLEY.